(12) United States Patent
Ahluwalia et al.

(10) Patent No.: US 8,030,229 B2
(45) Date of Patent: *Oct. 4, 2011

(54) COMPOSITE MATERIAL

(75) Inventors: Younger Ahluwalia, Desoto, TX (US);
Matti Kiik, Richardson, TX (US);
Thomas D. Karol, Dallas, TX (US)

(73) Assignee: ElkCorp., Dallas, TX (US)

( * ) Notice: Subject to any disclaimer, the term of this patent is extended or adjusted under 35 U.S.C. 154(b) by 694 days.

This patent is subject to a terminal disclaimer.

(21) Appl. No.: 10/766,654

(22) Filed: Jan. 27, 2004

(65) Prior Publication Data

US 2004/0229053 A1    Nov. 18, 2004

Related U.S. Application Data

(63) Continuation-in-part of application No. 10/354,216, filed on Jan. 29, 2003, now abandoned, and a continuation-in-part of application No. 10/354,220, filed on Jan. 29, 2003, now abandoned, and a continuation-in-part of application No. 10/354,219, filed on Jan. 29, 2003, now Pat. No. 7,521,385.

(60) Provisional application No. 60/352,691, filed on Jan. 29, 2002, provisional application No. 60/352,692, filed on Jan. 29, 2002, provisional application No. 60/352,693, filed on Jan. 29, 2002.

(51) Int. Cl.
*B32B 17/04* (2006.01)
*B32B 15/14* (2006.01)
*B32B 27/04* (2006.01)
*B32B 27/12* (2006.01)

(52) U.S. Cl. ............ 442/136; 442/79; 442/97; 442/123; 442/148; 442/180; 442/376; 442/378

(58) Field of Classification Search .................... 442/79, 442/97, 123, 136, 148, 180, 376, 378; 428/402, 428/920, 921
See application file for complete search history.

(56) References Cited

U.S. PATENT DOCUMENTS

| | | | |
|---|---|---|---|
| 3,062,682 A | 11/1962 | Morgan et al. ................. 264/54 |
| 3,248,259 A | 4/1966 | Borsellino et al. ............ 442/148 |
| 3,512,192 A | 5/1970 | Simon ............................... 5/698 |
| 3,921,358 A | 11/1975 | Bettoli ............................ 52/314 |
| 4,162,342 A | 7/1979 | Schwartz ...................... 428/159 |
| 4,174,420 A | 11/1979 | Anolick et al. ................ 428/310 |
| 4,229,329 A | 10/1980 | Bennett ........................ 260/17 R |
| 4,357,436 A | 11/1982 | Zucker et al. ................. 524/448 |
| 4,495,238 A | 1/1985 | Adiletta ........................ 428/215 |
| 4,504,991 A | 3/1985 | Klancnik .......................... 5/698 |
| 4,600,634 A * | 7/1986 | Langer ........................... 428/220 |
| 4,613,627 A | 9/1986 | Sherman et al. ................ 521/68 |
| 4,717,614 A | 1/1988 | Bondoc et al. ................ 428/143 |
| 4,745,032 A | 5/1988 | Morrison ...................... 428/215 |
| 4,746,560 A | 5/1988 | Goeden ......................... 428/151 |
| 4,746,565 A | 5/1988 | Bafford et al. ................ 442/243 |
| 4,784,897 A | 11/1988 | Brands ........................... 428/219 |
| 4,935,232 A | 6/1990 | McIntosh ...................... 424/409 |
| D309,027 S | 7/1990 | Noone et al. ................. D25/139 |
| 4,994,317 A * | 2/1991 | Dugan et al. .................... 442/72 |
| 5,001,005 A | 3/1991 | Blanpied ....................... 428/283 |
| 5,086,084 A | 2/1992 | Michaelson .................. 521/137 |
| 5,091,243 A | 2/1992 | Tolbert et al. ................ 428/253 |
| 5,110,839 A | 5/1992 | Chao ............................... 521/83 |
| 5,130,191 A | 7/1992 | Pole .............................. 428/332 |
| 5,232,530 A | 8/1993 | Malmquist et al. ............. 156/78 |
| 5,338,349 A | 8/1994 | Farrar ......................... 106/18.12 |
| 5,345,738 A * | 9/1994 | Dimakis ...................... 52/309.9 |
| 5,369,929 A | 12/1994 | Weaver et al. .................. 52/557 |
| D369,421 S | 4/1996 | Kiik et al. .................... D25/139 |
| 5,540,980 A | 7/1996 | Tolbert et al. ................ 428/215 |
| 5,609,957 A | 3/1997 | Page et al. .................... 428/372 |
| 5,611,186 A | 3/1997 | Weaver .......................... 52/557 |
| 5,666,776 A | 9/1997 | Weaver et al. .................. 52/557 |
| 5,713,974 A | 2/1998 | Martin et al. .................. 65/17.2 |
| 5,717,012 A | 2/1998 | Bondoc et al. ................ 524/13 |
| 5,965,257 A | 10/1999 | Ahluwalia .................... 428/357 |
| 6,051,193 A | 4/2000 | Langer et al. ................. 422/179 |
| 6,093,481 A | 7/2000 | Lynn et al. .................... 428/217 |
| 6,136,216 A | 10/2000 | Fidler et al. ...................... 252/62 |
| 6,145,265 A | 11/2000 | Malarkey et al. ............... 52/555 |
| 6,207,738 B1 | 3/2001 | Zuckerman et al. .......... 524/156 |
| 6,228,497 B1 * | 5/2001 | Dombeck ..................... 428/392 |
| 6,289,648 B1 | 9/2001 | Freshwater et al. ............. 52/557 |
| 6,341,462 B2 | 1/2002 | Kiik et al. ..................... 428/352 |

(Continued)

FOREIGN PATENT DOCUMENTS

CA     1073600      3/1980

(Continued)

OTHER PUBLICATIONS

Ohlemiller et al., *Flammability Assessment Methodology for Mattresses*, NISTIR 6497, Jun. 2000.

(Continued)

*Primary Examiner* — Andrew T Piziali
(74) *Attorney, Agent, or Firm* — Fitzpatrick, Cella, Harper & Scinto

(57) ABSTRACT

A composite material comprising at least a first layer which comprises a surfactant component, surfactant-generated microcells, a filler component and a binder component; and a second layer which comprises a metallic component. The composite material may further comprise a substrate to which the first layer is adhered. The composite materials have heat insulating, and fire resistant characteristics and are particularly suited for use in building materials and mattresses.

21 Claims, No Drawings

U.S. PATENT DOCUMENTS

| | | | |
|---|---|---|---|
| 6,365,533 B1 * | 4/2002 | Horner et al. | 442/374 |
| 6,397,546 B1 | 6/2002 | Malarkey et al. | 452/518 |
| 6,500,560 B1 | 12/2002 | Kiik et al. | 428/489 |
| 6,503,976 B2 | 1/2003 | Zuckerman et al. | 524/156 |
| 6,514,362 B1 | 2/2003 | Zuckerman et al. | 156/79 |
| 6,586,353 B1 | 7/2003 | Kiik et al. | 442/320 |
| 6,660,667 B2 | 12/2003 | Zuckerman et al. | 442/131 |
| 6,673,432 B2 | 1/2004 | Kiik et al. | 428/301.1 |
| 6,708,456 B2 | 3/2004 | Kiik et al. | 52/98 |
| 6,872,440 B1 | 3/2005 | Kiik et al. | 428/141 |
| 2003/0040241 A1 | 2/2003 | Kiik et al. | 442/242 |
| 2003/0054717 A1 | 3/2003 | Ahluwalia | 442/136 |
| 2003/0176125 A1 | 9/2003 | Ahluwalia | 442/59 |
| 2003/0224679 A1 | 12/2003 | Ahluwalia | 442/72 |
| 2003/0228460 A1 | 12/2003 | Ahluwalia | 428/315.5 |
| 2004/0121114 A1 | 6/2004 | Piana et al. | 428/85 |
| 2004/0229052 A1 | 11/2004 | Ahluwalia et al. | 428/457 |
| 2004/0229054 A1 | 11/2004 | Ahluwalia et al. | 428/457 |
| 2004/0235379 A1 | 11/2004 | Ahluwalia et al. | 442/59 |
| 2005/0144728 A1 | 7/2005 | Jones et al. | 5/698 |
| 2005/0214555 A1 | 9/2005 | Ahluwalia | 428/489 |
| 2005/0215149 A1 | 9/2005 | Ahluwalia | 442/152 |
| 2005/0215150 A1 | 9/2005 | Ahluwalia | 442/152 |
| 2005/0215151 A1 | 9/2005 | Ahluwalia | 442/152 |
| 2005/0215152 A1 | 9/2005 | Ahluwalia | 442/152 |

FOREIGN PATENT DOCUMENTS

| | | |
|---|---|---|
| DE | 19729533 | 1/1999 |
| EP | 0388338 | 9/1990 |
| EP | 0391000 | 10/1990 |
| GB | 926749 | 5/1963 |
| GB | 1228592 | 4/1971 |
| GB | 2167060 | 5/1986 |
| GB | 2167060 A * | 5/1986 |
| SU | 564374 | 8/1977 |
| WO | WO 95/34609 | 12/1995 |
| WO | WO 99/00338 | 1/1999 |
| WO | WO 01/40568 | 6/2001 |
| WO | WO 01/63986 | 8/2001 |
| WO | WO 02/00425 | 1/2002 |
| WO | WO 02/00427 | 1/2002 |
| WO | WO 02/46550 | 6/2002 |
| WO | WO 03/24881 | 3/2003 |

OTHER PUBLICATIONS

State of California Department of Consumer Affairs Bureau of Home Furnishings and Thermal Insulation Technical Bulletin 129, Oct. 1992, *Flammability Test Procedure for Mattresses for use in Public Buildings*.

Popovics, *Concrete Materials: Properties, Specifications and Testing*, pp. 375, 394, Noyes Publications, New Jersey, 1992.

Endur-All Technologies, Inc., *Using DURATHON™ to Re-engineer the Residential Roofing Industry*, Endur-All Technologies, Inc., Colorado, 2001.

* cited by examiner

COMPOSITE MATERIAL

SPECIFICATION

This application is a continuation-in-part of U.S. application Ser. No. 10/354,216, filed on Jan. 29, 2003, now abandoned, which claims priority under 35 U.S.C. §119(e) to Provisional Application No. 60/352,691 filed Jan. 29, 2002; of U.S. application Ser. No. 10/354,220, filed on Jan. 29, 2003, now abandoned, which claims priority under 35 U.S.C. §119(e) to Provisional Application No. 60/352,692 filed Jan. 29, 2002; of U.S. application Ser. No. 10/354,219 filed Jan. 29, 2003, now U.S. Pat. No. 7,521,385, which claims priority under 35 U.S.C. §119(e) to Provisional Application No. 60/352,693 filed Jan. 29, 2002.

FIELD OF THE INVENTION

This invention relates to composite materials and to structural articles and fire resistant fabric materials made therefrom, and more particularly to such materials which may be used in building materials to impart heat insulating and fire resistant properties to the building materials. The inventive composite materials may also be adhered to decorative fabrics to provide fire resistant decorative fabrics especially suitable for use in fire resistant clothing and in mattresses, draperies, furniture upholstery, and the like. The invention further relates to articles of manufacture that utilize the composite materials of the invention, e.g. motor vehicles and buildings.

BACKGROUND OF THE INVENTION

Various attempts have been made to produce heat insulating, fire resistant structural materials and fabrics having characteristics that make them suitable for use in building materials, clothing, motor vehicles, mattresses and in other applications.

U.S. Pat. No. 5,540,980 is directed to a fire resistant fabric useful for mattress ticking. The fabric is formed from a corespun yarn comprising a high temperature resistant continuous filament fiberglass core and a low temperature resistant staple fiber sheath, which surrounds the core. The fiberglass core comprises about 20% to 40% of the total weight of the corespun yarn while the sheath comprises about 80% to about 60% of the total weight of the corespun yarn. The corespun yarn can be woven or knit to form fabric with fire resistant characteristics. When exposed to a flame, the sheath chars and the fiberglass core serves as a fire barrier. In a preferred embodiment, the sheath is made from cotton.

U.S. Pat. No. 5,091,243 discloses a fire barrier fabric comprising a substrate formed of corespun yarns and a coating carried by one surface of the substrate. Other fire resistant fabrics include Fenix™ (Milliken, LaGrange, Ga.) and fabrics made by Freudenberg (Lowell, Mass.), Ventex Inc. (Great Falls, Va.), BASF, Basofil Fiber Division (Enka, N.C.), Carpenter Co. (Richmond, Va.), Legget and Platt (Nashville, Tenn.), Chiquala Industries Products Group (Kingspoint, Tenn.), and Sandel (Amsterdam, N.Y.). DuPont also manufacturers a fabric made from Kevlar™ thread. In addition, the mattress industry has attempted to manufacture mattresses by using Kevlar™ thread, glass thread, flame retardant polyurethane foams, flame retardant ticking, flame retardant cotton cushioning and flame retardant tape. However, use of these materials adds to the cost of mattresses and may result in a cost-prohibitive product. Additionally, some fire-resistant threads, such as glass threads, are difficult to work with and can break, adding to the time required for manufacturing the mattress, which also translates into added costs.

Flame retardant tapes are also difficult to work with and increase production time. In addition, flame retardant tapes are only available in a limited number of colors and sizes. Flame retardant polyurethanes may release noxious gases when they smolder and ignite. Furthermore, the process for flame retarding ticking often compromises the desired characteristics of the ticking (e.g. it may no longer be soft, drapable, pliable, flexible, etc).

For many years substrates such as fiberglass have been coated with various compositions to produce materials having utility in, among other applications, the building industry. U.S. Pat. No. 5,001,005 relates to structural laminates made with facing sheets. The laminates described in that patent include thermosetting plastic foam and have planar facing sheets comprising 60% to 90% by weight glass fibers (exclusive of glass micro-fibers), 10% to 40% by weight non-glass filler material and 1% to 30% by weight non-asphaltic binder material. The filler materials are indicated as being clay, mica, talc, limestone (calcium carbonate), gypsum (calcium sulfate), aluminum trihydrate (ATH), antimony trioxide, cellulose fibers, plastic polymer fibers or a combination of any two or more of those substances. The patent further notes that the filler materials are bonded to the glass fibers using binders such as urea-, phenol- or melamine-formaldehyde resins (UF, PF, and MF resins), or a modified acrylic or polyester resin. Ordinary polymer latexes used according to the disclosure are Styrene-Butadiene-Rubber (SBR), Ethylene-Vinyl-Chloride (EVCl), PolyVinylidene Chloride (PvdC), modified PolyVinyl Chloride (PVC), PolyVinyl Alcohol (PVOH), and Poly-Vinyl Acetate (PVA). The glass fibers, non-glass filler material and non-asphaltic binder are all mixed together to form the facer sheets.

U.S. Pat. No. 4,745,032 discloses an acrylic coating comprised of one acrylic underlying resin, which includes fly ash and an overlying acrylic resin, which differs from the underlying resin.

U.S. Pat. No. 4,229,329 discloses a fire retardant coating composition comprising fly ash and vinyl acrylic polymer emulsion. The fly ash is 24 to 50% of the composition. The composition may also preferably contain one or more of a dispersant, a defoamer, a plasticizer, a thickener, a drying agent, a preservative, a fungicide and an ingredient to control the pH of the composition and thereby inhibit corrosion of any metal surface to which the composition is applied.

U.S. Pat. No. 4,784,897 discloses a cover layer material on a basis of a matting or fabric, which is especially for the production of gypsum boards and polyurethane hard foam boards. The cover layer material has a coating on one side, which comprises 70% to 94% powdered inorganic material, such as calcium carbonate, and 6% to 30% binder. In addition, thickening agents and cross-linking agents are added and a high-density matting is used.

U.S. Pat. No. 4,495,238 discloses a fire resistant thermal insulating composite structure comprised of a mixture of from about 50% to 94% by weight of inorganic microfibers, particularly glass, and about 50% to 6% by weight of heat resistant binding agent.

U.S. Pat. No. 5,965,257, issued to the present assignee, the entire disclosure of which is incorporated herein by reference, discloses a structural article having a coating which includes only two major constituents, while eliminating the need for viscosity modifiers, for stabilizers or for blowing. The structural article of U.S. Pat. No. 5,965,257 is made by coating a substrate having an ionic charge with a coating having essentially the same iconic charge. The coating consists essentially of a filler material and a binder material. The assignee, Elk, produces a product in accordance with the invention of U.S. Pat. No. 5,965,257 which is marketed as VersaShield®.

As indicated in U.S. Pat. No. 5,965,257, VersaShield® has a variety of uses. However, it has been found that the products made in accordance with U.S. Pat. No. 5,965,257 are not satisfactory for certain uses because they lack sufficient drapability.

U.S. patent application Ser. No. 09/955,395, filed on Sep. 18, 2001, also assigned to the present assignee, the entire disclosure of which is incorporated herein by reference, addresses these inadequacies with a fire resistant fabric material comprising a substrate having an ionic charge coated with a coating having essentially the same ionic charge wherein the coating comprises a filler component which includes clay and a binder component. The fire resistant fabric material thus produced has satisfactory flexibility, pliability and drapability characteristics. However, while this material is suitable as a fire resistant fabric material, it is desirable to provide a fire resistant material that would also have cushioning or "bounceback" characteristics.

U.S. Pat. No. 6,228,497 teaches a fire resistant glass fiber which is made by mixing together glass fibers, a binder and calcium carbonate. In addition, clay may be added to improve fire resistance.

U.S. Pat. No. 4,994,317 teaches a multilayered fire resistant material which comprises a flame durable textile fabric substrate, a flexible silicone polymer layer, and a heat reflective paint. Clay may be added to the silicone layer to enhance flame resistance.

GB 2167060 teaches a fire resistant material comprising synthetic mineral fibers (including glass wool), clay and a binder. The fire resistant material is made by combining the components. The binder is preferably starch or modified starch; condensates of phenol, urea, melamine, resorcinol, tannin with aldehyde, isocyanates, reactive cements; binders formed in situ by inter-reaction between silica and calcium; hydraulic cements; and potassium and sodium silicates.

U.S. patent application Ser. No. 10/354,216, filed on Jan. 29, 2003, which this application claims priority to as a continuation-in-part, relates to fire resistant structural materials and to fire resistant fabric materials made therefrom. The structural materials comprise a surfactant component, surfactant generated microcells, a filler component and a binder component. The structural material is fire resistant. The structural material may be used to coat a substrate to make fire resistant fabric materials.

U.S. patent application Ser. No. 10/354,220, filed on Jan. 29, 2003, which this application claims priority to as a continuation-in-part, relates to a structural material comprising a prefabricated microcell component, a surfactant component, a surfactant-generated microcell component, a filler component and a binder component. The prefabricated microcell component is essentially a hollow sphere or a component capable of forming a hollow sphere that has been constructed or manufactured before being employed in the structural material. The structural material may be used to coat a substrate to make a fire resistant fabric material.

U.S. patent application Ser. No. 10/354,219, filed on Jan. 29, 2003, which this application claims priority to as a continuation-in-part, relates to a structural material comprising a surfactant component, surfactant-generated microcells, a gel catalyst component and a binder component. The structural material may further comprise a filler component. The structural material may be used to coat a substrate to make a fire resistant fabric material.

SUMMARY OF THE INVENTION

The present invention relates to a composite material comprising a first layer, which comprises a surfactant component, surfactant-generated microcells, a filler component, and a binder component, and a second layer, which comprises a metallic component. The composite material is useful, inter alia, for making fire resistant building materials and fabric materials. The composite materials may further include a substrate to which the first layer is adhered to provide a coated substrate. The substrate may be planar and the first layer may be adhered to one or both sides of the substrate. The second layer may be adhered to one or both first layer surfaces or to the substrate directly. If no substrate is employed and if the first layer is planar, then the second layer may be adhered to one or both sides of the first layer. The composite materials of the invention may further include a water repellent material, an antifungal material, an antibacterial material, a surface friction agent, a flame retardant material and/or an algaecide. Further, the structural materials may be colored with dye.

The composite materials of the present invention may be employed in building materials to make heat insulating, fire resistant building materials. In such an embodiment, the composite materials of the present invention may be applied to a structural article such as building materials, (e.g. gypsum board and siding materials, including sheathing). The building materials may be prepared during the building material making process to include the composite materials of the present invention or the composite materials may be utilized after the building materials have already been installed.

In a particularly preferred embodiment, the first layer does not bleed through the substrate during the material making process. The substrate may be any suitable reinforcement material capable of withstanding processing temperatures and is preferably woven fiberglass. The binder is preferably acrylic latex and the filler preferably comprises clay. The surfactant may be any surfactant capable of forming microcells. In a preferred embodiment, the surfactant is a fast soap, such as ammonium lauryl sulfate (ALS). A fast soap generates microcells quickly in quantity and/or volume.

The second layer which comprises a metallic component may comprise any metallic component known in the art which his capable of imparting heat insulating properties. The metallic component includes, but is not limited to, aluminum and stainless steel. The metallic component may be adhered as a coating on the first layer. For example, it may be adhered by electro deposition, spraying, or knife coating. The metallic component may also be adhered as a sheet of metal (e.g. metal foil) which is laid on the first layer while it is still wet. When the first layer dries, the metal foil forms a mechanical bond with the first layer. In a preferred embodiment, the metallic component is aluminum foil. However, it may be preferred to employ stainless steel as the metallic component where there are concerns of corrosion, e.g., for use in a motor vehicle or use in other environments that include batteries.

DETAILED DESCRIPTION

The composite material of the invention comprises a first layer comprising a surfactant component, surfactant-generated microcells, a filler component and a binder component, and a second layer comprising a metallic component. As used herein, surfactant-generated microcells are essentially voids or hollow spheres which are formed by the presence of a surfactant during the composite material making process. Thus, the surfactant components of the present invention are capable of forming microcells. The surfactant-generated microcells impart various characteristics to the fabric materials of the present invention, including, inter alia, improved fire resistance, flexibility, pliability, drapability and "bounce back". As used herein, the metallic component is any metallic component capable of imparting heat insulating properties, for example, aluminum and stainless steel. The metallic component may be a metal film or foil, or it may be sprayed onto the first layer or onto the substrate and then heat dried in an oven. In a preferred embodiment, the metallic component is aluminum foil.

In accordance with the invention, a composite material may be made by adhering the first layer to one or both sides of a substrate to provide a coated substrate. The second layer is adhered to the first layer or to the substrate directly. When the second layer metallic component is applied directly to the substrate, an adhesive is employed to facilitate adherence. In a preferred embodiment, the first layer does not bleed through the substrate during the material making process. As used herein, the term "coated substrate" means a material wherein at least a part of the substrate is coated with the coating.

The filler component of the present invention preferably includes clay. The clay is preferably China clay which is very soft and light. Alternatively, the clay may be Paragon™, which is also a soft clay (i.e. it is soft to the touch), Suprex™, which is a hard clay (i.e. it is hard to the touch), Suprex™ amino silane treated clay, which is used for crosslinking because it will chemically bond with binder and also for highloading, Ballclay™, which has elastic properties (i.e. it feels rubbery), Texwhite 185 (available from Huber, Dry Branch, Ga.), and ECC 1201 (available from Huber). All of above-listed clay products, unless otherwise noted, are available, for example, from Kentucky-Tennessee Clay Company of Langley, S.C. In one embodiment, the clay is Ballclay™ 3380 which is particularly inexpensive compared to other clays. In a preferred embodiment, the clay is Kaolin clay which is a lower grade China clay. In particularly preferred embodiments, the clay is Texwhite 185 and/or ECC 1201 (see Table I and Table II below).

In the present invention, clay is a preferred filler because of its elongation properties (it has a low modulus), its abrasion resistance, its tear resistance, and its tensile strength. Moreover, clay is a good heat barrier; it does not disintegrate when an open flame (temperature $\geq$1500° F.) is applied directly to a coating of the present invention that includes clay. In addition, clay provides a slick, elastic, glassy surface which exhibits flexibility. Furthermore, as noted, clay is inexpensive and can help to keep the cost of the fabric material low.

The filler material may alternatively or additionally comprise a filler selected from the group consisting of decabromodiphenyloxide (FRD-004; Tiarco Chemicals, Dalton, Ga.), antimony trioxide, calcium carbonate, charged calcium carbonate, titanium dioxide, fly ash (such as Alsil O4TR™ class F fly ash produced by JTM Industries, Inc. of Martin Lake and Jewett, Tex. which has a particle size such that less than 0.03% remains on an agitated 0.1 inch X 0.1 inch screen), 3-X mineralite mica (available from Engelhard, Inc. of Louisville, Ky.) and glass or ceramic microspheres (glass microspheres are 2.5 times lighter than ceramic microspheres, both provide fire resistance), or any mixture of these filler materials to meet desired cost and weight criteria. Glass and ceramic microspheres are manufactured by Zeelan Industries of 3M Center Bldg., 220-8E-04, St. Paul, Minn. 55144-1000. Calcium carbonate may be obtained from Franklin Industrial Minerals of 612 Tenth Avenue North, Nashville, Tenn. 37203.

Calcium carbonate, talc and fly ash filler increase the weight of the product, but utilization of glass and/or ceramic microspheres enables the manufacture of a product with reduced weight and increased fire resistant properties. Clay may impart to the product the following nonlimiting characteristics: (1) lower heat build-up, (2) heat reflectance properties, (3) fire barrier properties, (4) no weight loss when exposed to heat and open flame, and (5) reduced disintegration when exposed to heat and open flame. Decabromodiphenyloxide and antimony trioxide impart the following nonlimiting characteristics: (1) flame retardant properties, (2) capability of forming a char, and (3) capability of stopping the spread of flames. It is believed that the gas produced from the heating of the decabromodiphenyloxide can also act as a flame retardant because the gas uses up oxygen or depletes oxygen in the layer next to the fabric and suppresses or stops the fire from further progression.

Glass and ceramic microspheres can withstand heat greater than 2000° F. Also, glass and ceramic microspheres increase compressive strength, absorb no latex and/or water and thus permit the faster drying of the product. Glass and ceramic microspheres also increase product flexibility.

Further, the glass and ceramic microspheres help to increase the pot life of the coating. Heavier particles in the fillers, although they may comprise but a small percentage of the particles in the filler, have a tendency to settle near the bottom of a storage vessel. When glass and/or ceramic microspheres are mixed together with another filler, a dispersion is produced which has an increased pot life or shelf life. Without wishing to be bound by any particular theory, it is believed that as the filler particles naturally fall in the vessel and the glass and ceramic microspheres rise, the smaller size filler particles are supported by the glass and/or ceramic microspheres, thus enabling the microspheres to stay in solution and preventing the filler particles, at least to some extent, from descending to the bottom of the vessel.

The first layer of the composite material of the present invention is prepared by using a binder component such as a high performance heat-reactive acrylic latex polymer and/or a non-heat reactive styrene butadiene latex to bond the filler materials together. Where the first layer is adhered to a substrate, the binder component may also act to bond the first layer to the substrate. In one embodiment of the invention, the binder component is Rhoplex 3349 (Rohm and Haas, Philadelphia, Pa.) and/or Rovene 4402 (Mallard Creek Polymer, Inc. Charlotte, N.C.). Additional or alternative binders include, inter alia, Hycar™ 26469, Hycar™ 26472, Hycar™ 26484, Hycar™ 26497, Hycar™ 264552, Hycar™ 264512, Hycar™ 264582, Hycar™ 26083 (low formaldehyde), Hycar™ 9201 (low formaldehyde), Hycar™ 1552 (nitrile), Hycar™ 1571 (nitrile), Vycar™552, Hycar™ 2679 acrylic latex polymer (all Hycar™ and Vycar™ products are supplied by B.F. Goodrich Company of Cleveland, Ohio). Binder components may also include Cymel™ 373 (available from American Cyanamid), RHOPLEX™ TR 407 and R&H GL-618 latex both available from Rohm & Haas, and Borden FG-413F UF resin (available from Borden). It is believed, however, that any linear polymer, linear copolymer or branched polymer may be useful in preparing the first layer, such as those available from BASF and Goodyear. Further possible binder materials include butyl rubber latex, SBR latex, neoprene latex, polyvinyl alcohol emulsion, SBS latex, water based polyurethane emulsions and elastomers, vinyl chloride copolymers, nitrile rubbers and polyvinyl acetate copolymers. In a preferred embodiment, an SBR latex is used. SBR latex adds good softness characteristics but is not a flame retardant. To improve fire resistance, an acrylic latex may be added or substituted. The more acrylic latex, the better the fire resistance of the material. However, softness is decreased when acrylic latex is substituted for the SBR latex.

The surfactant component of the present invention may be any surfactant capable of forming microcells during making of the first layer. In a preferred embodiment, the surfactant comprises a "fast soap", such as ammonium lauryl sulfate (ALS) (e.g. Stepanol AM; Stepan Chemicals, Northfield, Ill.) and sodium lauryl sulfate (SLS). Generally, a "fast soap" is a soap which is capable of efficiently modifying the surface tension of a solvent, such as water. However, other surfactants may also be used which are not characterized as fast soaps but which are capable of forming microcells. Fast soaps, such as ALS, form microcells that are resilient and are generally stable to the heat of processing. Surfactant-generated microcells are generally not stable at temperatures above 350° F. Additional components may be added to further stabilize the microcells, as further discussed below. However, if so desired, a surfactant which forms "weak" microcells may be used. The "weak" microcells may burst during processing to produce collapsed microcells which produce a less flexible fire resistant material.

In one embodiment of the present invention, the first layer of the composite material is made by combining the binder component, the surfactant component and the filler component together and creating surfactant-generated microcells. Surfactant-generated microcells may be created by any means known in the art, such as, but not limited to, blowing air into the mixture, agitation or by a foamer. Surfactant-generated microcells may also be introduced using chemical blowing agents, such as azo compounds which release nitrogen.

In one embodiment of the invention, the mixture of the first layer is subjected to a foamer. The foamer acts to inject air into the mixture so that the surfactant forms microcells within the mixture. The foamer may comprise a tube-like component having a multitude of pins which are capable of rotating in opposing directions (e.g. some pins move clockwise and some move counterclockwise). The mixture of binder, surfactant and filler is added to the foamer through a port on one side and, as it passes through the foamer, the pins rotate causing the surfactant to form microcells. Additionally, air may also be introduced into the foamer at another port to further enhance surfactant-generated microcell formation. After having been subjected to the foamer, the mixture may then be applied onto a substrate, such as a fiberglass mat. Alternatively, the mixture may be applied onto a receiving platform, such as a steel tray to form a freestanding sheet. Whether applied to a substrate or a receiving platform, the material is subjected to heat in an oven. Processing temperatures are preferably from about 280° F. to about 350° F. In a preferred embodiment, the surfactant-generated microcells are stable to the heat of processing. Generally, the surfactant-generated microcells are not stable above 350° F. Preferably, the surfactant-generated microcells are relatively small and uniform in size.

In another embodiment of the invention, the first layer of the composite material is produced with collapsed microcells. Such a material may be prepared using a surfactant capable of forming microcells but which does not efficiently modify the surface tension of water. During the heat of processing, the surfactant-generated microcells expand, due to the expansion of gases within them, burst and collapse. The inclusion of collapsed microcells produces a composite material that is less flexible.

In another embodiment, the first layer of the heat insulating, fire resistant composite material also includes a surfactant capable of regulating surfactant-generated microcell formation. One such surfactant is Stanfex 320, (Parachem, Dalton, Ga.). The surfactant capable of regulating surfactant-generated microcell formation can ensure that the microcells remain within a preferred size range (e.g. do not get too big) and form in a relatively monodisperse state (i.e., are of the same general size). In a preferred embodiment, the surfactant-generated microcells are about 5.0µ to about 20.0µ in diameter. In addition, citric acid may be used to ensure that the surfactant-generated microcells are spread out uniformly.

It may also be desirable for the first layer of the composite materials to include a dispersant which acts to keep the mixture comprising the binder, surfactant and filler well dispersed during the material making process. Examples of such dispersants include, inter alia, TSPP, Accuma 9300, Accuma 9400 and Accuma 9000 (all available from Rohm & Haas).

The second layer comprising the metallic component may be adhered to the first layer by any means known in the art. In a preferred embodiment, the metallic component is aluminum foil and is applied to the first layer while the first layer is still wet. When the material is subjected to the heat of an oven to dry the first layer, an adhesive bond is formed between the dried first layer and the aluminum foil. Alternatively, the metallic component may be adhered by electro deposition, spraying, knife coating, or any other means known in the art.

The composite materials of the present invention are flexible and pliable. In addition they are durable and preferably do not crack upon bending. Durability of the composite materials may be enhanced by adding components capable of stabilizing the surfactant-generated microcells. Such components include surfactants such as ammonium stearate (available from Parachem, Dalton, Ga.), octosol A18 (Tiarco Chemicals, Dalton, Ga.), A-1 (disodium n-alkylsulfosuccinate; Tiarco Chemicals), 449 (potassium oleate, Tiarco Chemicals), and Stanfex 320. The surfactant-generated microcell may be stabilized by making the wall of the microcell thicker. A surfactant having a long waxy chain may be particularly useful for stabilizing the microcells.

The first layer of the composite material may further include a cross-linking component, such as melamine (Borden Chemicals, Morganton, N.C.) and/or ammonium chloride. The cross-linking component is useful to improve durability and microcell structural strength. In order to control the amount and rate of cross-linking, it may be desired to control the pH of the mixed components. For example, in acidic conditions (pH ~4.0), the cross-linking will occur very quickly and the mixture will have a short pot-life. At higher pH (~10.0), the cross-linking proceeds more slowly and can be controlled by heat.

The first layer of the composite material of the present invention may also comprise resin which may provide a polymer shell to encapsulate air. In one embodiment, the resin is DPG-38, available from Parachem of Dalton, Ga.

In a preferred embodiment, the first layer of the composite material further possesses "bounceback" characteristics. As used herein, "bounceback" refers to the ability of the material to return to its original shape after having been distorted, such as stretched or compressed. In such an embodiment, additional components are added to the first layer to achieve such bounceback characteristics. These components may coat the inside of the microcell such that the microcell reverts to its original shape after having been distorted. Preferred components useful for achieving bounceback characteristics include CT101 (silicon oil; Kelman Industries, Duncan, S.C.), Freepel 1225 (BF Goodrich, Cleveland, Ohio), Sequapel 409 (Omnovasolutions, Inc. of Chester, S.C.), Michem emulsion 41740 (available from Michelman, Inc. of Cincinnati, Ohio), Syloff-1171A (available from Dow Corning, Corporation of Midland, Mich.), Syloff-62 (Dow Corning), Syloff-7910

(Dow Corning) and Aurapel 391 (available from Sybron/Tanatex of Norwich, Conn.). These components also ensure that the microcells do not aggregate and form clumps of microcells.

The substrate of the present invention may be any suitable reinforcement material capable of withstanding processing temperatures, such as glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenolformaldehyde resin fibers, aromatic and aliphatic polyamide fibers, polyacrylamide fibers, polyacrylimide fibers or mixtures thereof which may include bicomponent fibers. The substrate provides strength for the composite material.

Examples of substrates in accordance with the invention include, inter alia, glass, fiberglass, ceramics, graphite (carbon), PBI (polybenzimidazole), PTFE, polyaramides, such as KEVLAR™ and NOMEX™, metals including metal wire or mesh, polyolefins such as TYVEK™, polyesters such as DACRON™ or REEMAY™, polyamides, polyimides, thermoplastics such as KYNAR™ and TEFZEL™, polyether sulfones, polyether imide, polyether ketones, novoloid phenolic fibers such as KYNOL™, KoSa™ polyester fibers, JM-137 M glass fibers, Owens-Corning M glass, Owens-Corning K glass fibers, Owens-Corning H glass fibers, Evanite 413M glass microfibers, Evanite 719 glass microfibers, cellulosic fibers, cotton, asbestos and other natural as well as synthetic fibers. The substrate may comprise a yarn, filament, monofilament or other fibrous material either as such or assembled as a textile, or any woven, non-woven, knitted, matted, felted, etc. material. The polyolefin may be polyvinyl alcohol, polypropylene, polyethylene, polyvinyl chloride, polyurethane, etc. alone or in combination with one another. The acrylics may be DYNEL, ACRILAN and/or ORLON. RHOPLEX AC-22 and RHOPLEX AC-507 are acrylic resins sold by Rohm and Haas which also may be used. The cellulosic fibers may be natural cellulose such as wood pulp, newsprint, Kraft pulp and cotton and/or chemically processed cellulose such as rayon and/or lyocell.

Nonlimiting examples of non-woven materials that may be useful in the present invention include non-woven, continuous fiberglass veils, such as Firmat™100, Pearlveil™ 110, Pearlveil™ 210, Curveil™ 120, Curveil™ 220, Flexiveil™130, Flexiveil™ 230 and Pultrudable veil (all available from Schmelzer Industries, Inc., Somerset, Ohio). The woven materials may be Airlaid™, Spunbond™ and Needlepunch™ (available from BFG Industries, Inc. of Greensboro, N.C.). Nonlimiting examples of filament materials include C, DE, G, H, K, M filaments (glass fiber filaments of differing thicknesses) of various grades, including electrical grade, chemical grade and high strength grade (all available from BFG Industries, Inc. of Greensboro, N.C.). As used herein, a fiberglass mat includes nonwoven and woven fiberglass mats. In one embodiment, the substrate is a nonwoven fiberglass mat which comprises from about 70-95% H glass filaments, from about 0-5% Evanite microglass at 4.5 microns, from about 0-15% polyester fiber (50/50 mix of ¼ inch and ½ inch length), and from about 5-10% acrylic based binder with a glass transition temperature (Tg) at 18° F.

In a particularly preferred embodiment, the substrate of the present invention is a woven fiberglass mat such as style 1625, style 1610 and style 1614 of BGF Industries (Greensboro, N.C.).

The composite materials of the present invention may be employed to make heat insulating, fire resistant building materials. Such building materials may be prepared during the building materials making process to include the composite materials of the present invention, or the composite materials may be utilized after building materials have already been installed. The composite materials may be used on their own or in conjunction with (e.g. as a liner for) other materials. For example, they may be applied to a structural article, such as building materials (e.g. gypsum board and siding materials, including sheathing) to obtain a heat insulating, fire resistant structural article. Such a structural article is useful for providing effective fire walls in buildings, including homes, and can provide a greater escape time and reduced heat exposure for the occupants of the building. In addition, the composite materials of the present invention may be applied to attic ceilings. The composite materials may be used to surface a roof prior to the application of roofing materials, or they may comprise part of a roofing material.

The composite materials may further be used to impart heat insulation and fire resistance to other objects, such as motor vehicles, trains, aircrafts, space ships, heating units, air conditioners, washing machines, dryers, furniture, mattresses and any other objects for which heat insulating and fire resistance properties are desired, such as upholstered articles, bedroom articles, (including children's bedroom articles), draperies, carpets, tents, awnings, fire shelters, sleeping bags, ironing board covers, barbecue grill covers, fire resistant gloves, airplane seats, engine liners, and fire-resistant clothing for race car drivers, fire fighters, jet fighter pilots, astronauts, facing sheets, building air duct liners, roofing underlayment (or roofing felt), underlayment for organic, built up roofing materials, roll roofing, modified roll products, filter media (including automotive filters), automotive hood liners, head liners, fire walls, vapor barriers etc. The use of the composite materials of the present invention in articles may enable the articles to exceed current flammability standards.

Composite materials made in accordance with this invention may be of any shape. Preferably, such articles are planar in shape. The composite materials of the present invention are flexible and pliable. In addition they are durable and preferably do not crack upon bending.

In making the composite material, a planar substrate may be coated on one side or both sides depending on the intended application. As used herein, "coated on one side or both sides" means that the coating coats at least a part of one side or at least a part of both sides of the substrate. For instance, if one side of the substrate is coated with the filler/binder coating, the other surface may be coated with another material. In the roofing materials industry, for example, the other material may be conventional roofing asphalt, modified asphalts and non-asphaltic coatings, and the article may then be topped with roofing granules. It is believed that such roofing material could be lighter in weight, offer better fire resistance and better performance characteristics (such as cold weather flexibility, dimensional stability and strength) than prior art roofing materials.

Additionally, the composite material may be coated with a water repellent material or the water repellant material may be added in the coating (i.e. internal water proofing). Two such water repellant materials are Aurapel™ 330R and Aurapel™ available from Sybron/Tanatex of Norwich, Conn. In addition, Omnova Sequapel™ and Sequapel 417 (available from Omnovasolutions, Inc. of Chester, S.C.); BS-1306, BS-15 and BS-29A (available from Wacker of Adrian, Mich.); Syl-ff™-7922, Syl-off™-1171A, Syl-off-™-7910 and Dow Corning 346 Emulsion (available from Dow Corning, Corporation of Midland, Mich.); Freepel™-1225 (available from BFG Industries of Charlotte, N.C.); and Michem™Emulsion-41740 and Michem™ Emulsion-03230

(available from Michelman, Inc. of Cincinnati, Ohio) may also be used. It is believed that wax emulsions, oil emulsions, silicone emulsions, polyolefin emulsions and sulfonyls as well as other similar performing products may also be suitable water repellant materials.

A defoamer may also be added to the coating of the present invention to reduce and/or eliminate foaming during production. One such defoamer is Drew Plus Y-250 available from Drews Inductrial Division of Boonton, N.J. In addition, ionic materials may be added to increase the ionic charge of the coating, such as ammonium hydroxide, Natrosol-NEC™ available from Hercules of Wilmington, Del.) and ASE-95NP and ASE-60 (available from Rohm & Haas of Charlotte, N.C.).

Fire retardant materials may also be added to the first layer of the composite materials of the present invention to further improve the fire resistance characteristics. Nonlimiting examples of fire retardant materials which may be used in accordance with the present invention include FRD-004 (decabromodiphenyloxide; Tiarco Chemiclas, Dalton, Ga.), FRD-01, FR-10, FR-11, FR-12, FR-13, FR-14 (all available from Tiarco Chemicals), zinc oxide, and aluminum trihydrate (ATH).

Further, heat insulating and fire resistant composite materials made in accordance with the invention may be coated with an algaecide such as zinc powder, copper oxide powder or the herbicides Atrazine available from e.g. Ribelin Inductries or Diuron avaibable from e.g. Olin Corporation, and antifungal material such as Micro-Chek™ 11P, an antibacterial material such as Micro-Check™11-S-160, a surface friction agent such as Byk™-375, a flame retardant material such as ATH (aluminum trihydrate) available from e.g. Akzo Chemicals and antimony trioxide available from e.g. Laurel Inductries. In addition, color pigments, including, but not limited to, T-113 (Abco, Inc.), W-4123 Blue Pigment, W2090 Orange Pigment, W7717 Black Pigment and W6013 Green Pigment, iron oxide red pigments (available from Engelhard of Louisville, Ky.) may also be added to the coating of the present invention to impact desired characteristics, such as a desired color. The Micro-Chek™ products are available from the Ferro Corporation of Walton Hills, Ohio. Byk-375 may be obtained from Wacker Silicone Corporation of Adrian, Mich. and T-1133A is sold by Abco Enterprises Inc. of Allegan, Mich.

The additional coatings of e.g. water repellant material, antifungal material, antibacterial material, etc., may be applied to one or both sides of composite materials otherwise having filler/binder coating on one of both sides of the substrate. For example, heat insulating, fire resistant composite materials comprising substrates coated on one or both sides with filer/binder coatings could be coated on one side with a water repellant composition and on the other side with an antibacterial agent. Alternatively, the water repellant material, antifingal material, antibacterial material, etc., may be added to the coating before it is used to coat the substrate.

As indicated, the heat insulating, fire resistant composite structural material of the present invention is useful in the manufacture of mattresses, particularly mattress borders. In mattress border embodiments, the composite structural material is placed either directly beneath the outer ticking layer or beneath a foam layer (preferably ¼" polyurethane foam) that is itself beneath the ticking layer. In this embodiment, the composite material may be used to line a decorative mattress fabric to produce a heat insulating, fire resistant mattress fabric. Nonlimiting examples of mattress fabrics include ticking (known in the art as a strong, tightly woven fabric comprising cotton or linen and used especially to make mattresses and pillow covering), or fabrics comprising fibers selected from the group consisting of cotton, polyester, rayon, polypropylene, and combinations thereof. The lining may be achieved by methods known in the art. For example, the composite material of the present invention may simply be placed under a mattress fabric. Or, the heat insulating, fire resistant composite material may be bonded or adhered to the mattress fabric, for example using a flexible and preferably nonflammable glue or stitched with fire resistant thread i.e., similar to a lining, to make a heat insulating, fire resistant mattress fabric. The fire resistant mattress fabric of the present invention may then be used by the skilled artisan to manufacture a mattress product which has improved flammability characteristics.

Further materials which may be incorporated into the mattress products, particularly mattress borders, include construction materials, such as non fire retardant or fire retardant thread for stitching the mattress materials together (e.g. glass thread or Kevlar thread) and non-fire retardant or fire retardant tape. Silicon may be used with Kevlar thread to diminish breakage and enhance production time.

Fire resistant composite materials made in accordance with the present invention may be used in conjunction with foamed heat insulating materials made by any of the known methods for making foamed compositions such as, for example, aeration by mechanical mixing and the other techniques described in U.S. Pat. No. 5,110,839.

Table I below provides, in approximate percentages, the components of the first layer that the applicants believe would be useful in a preferred embodiment of composite material of the invention.

TABLE I

| Coating Components | % Wet |
|---|---|
| BINDER | |
| Rhoplex 3349 | 34.76 |
| TR407 | 3.96 |
| FILLER | |
| Clay ECC 1201 (Huber) | 42.07 |
| SURFACTANT | |
| Octosol A18 | 3.0 |
| Ammonium Stearate | 4.27 |
| CROSS-LINKER | |
| Melamine | 1.18 |
| MISCELLANEOUS | |
| Ammonium Nitrate | 0.12 |
| Aquamix 519 | 7.0 |
| Acrysol ASE-95NP | 0.2 |
| Water | 3.46 |
| Total Percentage | 100% |

SUBSTRATE = BGF Industries Style 1625 fiberglass mat

Although the table shows possible combinations of binder, filler and surfactant, it is believed that other combinations may be employed.

Table II below provides a list of components of the first layer of the structural material of the invention according to another preferred embodiment of the present invention.

TABLE II

| Coating Components | % Wet |
|---|---|
| BINDER | |
| Rhoplex 3349 | 21.58 |
| Rovene 4402 SBR | 21.58 |
| FILLER | |
| Clay ECC1201 (Huber) | 25 |
| Decabromodiphenyloxide | 13 |
| SURFACTANT | |
| Stepanol AM (ALS) | 0.16 |
| Octosol A-18 | 1.68 |
| Stanfex 320 | 4.27 |
| CROSS-LINKER | |
| Ammonium Chloride | 0.11 |
| Melamine | 3.49 |
| MISCELLANEOUS | |
| Acrysol ASE-95NP | 0.14 |
| Silicon Oil CT101 | 0.5 |
| Green Dye | 0.03 |
| Y250 defoamer | 0.01 |
| TSPP | 0.07 |
| Citric Acid | 0.05 |
| Tinunin 292 | 0.05 |
| Ammonium Hydroxide | 0.26 |
| Water | 8.02 |
| Total Percentage | 100.0% |

SUBSTRATE = BFG Industries Style Number 1625 fiberglass mat

The composite materials, as mentioned, may include a substrate and at least one layer which comprises a surfactant component, surfactant-generated microcells, a filler component, and a binder component, and a second layer which comprises a metallic component. The first layer of the composite material comprises approximately 34% by weight of the fire resistant fabric material. In that layer, about 44% to about 55% by weight is binder, about 0.1% to about 5.0% is surfactant, and from about 20% to about 55% is filler. In a preferred embodiment, the first layer comprises about 50% binder, about 10% surfactant and about 40% filler. The filler is preferably about 25% clay. The substrate is preferably woven glass. The substrate is approximately 68% by weight of the fire resistant fabric material. The binder which bonds together the glass fibers is approximately 50% Rhoplex 3349 and 50% Rovene 4402, or any other suitable binder. Nonlimiting examples of suitable binders are provided herein above. The second layer is preferably aluminum foil and is approximately 0.5% to 1.5% by weight of the composite material depending on whether one or two layers of foil are employed.

The substrate may be coated with the first layer by air spraying, dip coating, knife coating, roll coating or film application such as lamination/heat pressing. The first layer may be bonded to the substrate by chemical bonding, mechanical bonding and/or thermal bonding. Mechanical bonding is achieved by force-feeding the first layer onto the substrate with a knife. The second layer comprising the metallic component may be adhered to the first layer by any means known in the art, including chemical bonding and mechanical bonding.

When a substrate is employed, the first layer may be adhered on one side or both sides of the substrate, depending on the intended application. For instance, if one side of the substrate is covered to at least some extent with the first layer (and the second layer comprising the metallic component), then the other surface may be covered to at least some extent with another material. In the roofing materials industry, for example, the other material may be conventional roofing asphalt, modified asphalts and non-asphaltic coatings, and the article can then be topped with roofing granules. It is believed that such roofing material could be lighter in weight, offer better fire resistance and better performance characteristics (such as cold weather flexibility, dimensional stability and strength) than prior art roofing materials.

The mixture comprising the first layer which comprises the binder, surfactant and filler may have a consistency of a light foam, such as shaving cream. It is believed that due to the low density of the mixture, the surfactant-generated microcells formed therein do not pass through the substrate when applied thereto. Moreover, the viscosity of the coating can be increased through mixing to ensure that it does not bleed through the substrate. Nonlimiting examples of thickening agents include Acrysol ASE-95NP, Acrysol ASE-60, Acrysol ASE-1000, Rhoplex ASE-75, Rhoplex ASE-108NP, and Rhoplex E-1961, all available from Rohm & Haas.

Additionally, the first layer of the composite material may be coated with a water repellent material or the water repellent material may be added in the first layer (i.e., internal water proofing). Two such water repellent materials are Aurapel™ 330R and Aurapel™ 391 available from Sybron/Tanatex of Norwich, Conn. In addition, Omnova Sequapel™ and Sequapel 417 (available from Omnovasolutions, Inc. of Chester, S.C.); BS-1306, BS-15 and BS-29A (available from Wacker of Adrian, Mich.); Syl-off™-7922, Syl-off™-1171A, Syl-off™-7910 and Dow Corning 346 Emulsion (available from Dow Corning, Corporation of Midland, Mich.); Freepel™-1225 (available from BFG Industries of Charlotte, N.C.); and Michem™ Emulsion-41740 and Michem™ Emulsion-03230 (available from Michelman, Inc. of Cincinnati, Ohio) may also be used. It is believed that wax emulsions, oil emulsions, silicone emulsions, polyolefin emulsions and sulfonyls as well as other similar performing products may also be suitable water repellent materials. These materials are also useful, as mentioned above, for imparting bounce back characteristics to the composite materials of the invention. Water repellents may be particularly preferred for example, in the manufacture of building materials, crib mattresses, airplane seats and in the manufacture of furniture, particularly for industrial use.

A defoamer may also be added to the first layer of the present invention to reduce and/or eliminate foaming during production. One such defoamer is Y-250 available from Drews Industrial Division of Boonton, N.J.

Fire retardant materials may also be added to the first layer of the composite materials of the present invention to further improve the fire resistance characteristics. Nonlimiting examples of fire retardant materials which may be used in accordance with the present invention include FRD-004 (decabromodiphenyloxide; Tiarco Chemicals, Dalton, Ga.), FRD-01, FR-10, FR-11, FR-12, FR-13, FR-14 (all available from Tiarco Chemicals), zinc oxide, and aluminum trihydrate (ATH).

In addition, color pigments, including, but not limited to, T-113 (Abco, Inc.), W-4123 Blue Pigment, W2090 Orange Pigment, W7717 Black Pigment and W6013 Green Pigment, iron oxide red pigments (available from Engelhard of Louisville, Ky.) may also be added to the first layer of the present invention to impart desired color characteristics.

Further, heat insulating and fire resistant composite materials made in accordance with the invention may be coated with an algaecide such as zinc powder, copper oxide powder or the herbicides Atrazine available from e.g. Ribelin Industries or Diuron available from e.g. Olin Corporation, an antifungal material such as Micro-Chek™ 11P, an antibacterial material such as Micro-Chek™ 11-S-160, a surface friction agent such as Byk™-375, a flame retardant material such as ATH (aluminum trihydrate) available from e.g. Akzo Chemicals and antimony trioxide available from e.g. Laurel Industries. In addition, color pigments, including, but not limited to, T-113 (Abco, Inc.), W-4123 Blue Pigment, W2090 Orange Pigment, W7717 Black Pigment and W6013 Green Pigment, iron oxide red pigments (available from Engelhard of Louisville, Ky.) may also be added to the coating of the present invention to impart desired characteristics, such as a desired color. The Micro-Chek™ products are available from the Ferro Corporation of Walton Hills, Ohio. Byk-375 may be obtained from Wacker Silicone Corporation of Adrian, Mich. and T-1133A is sold by Abco Enterprises Inc. of Allegan, Mich.

The additional coatings of, e.g. water repellent material or antifungal material or antibacterial material, etc., may be applied to one or both sides of composite materials, preferably between the first layer and the second layer comprising the metallic component. For example, composite materials comprising substrates covered on one or both sides with the first layer filler/surfactant/binder coatings could be covered on one side with a water repellent composition and on the other side with an antibacterial agent beneath the second layer comprising the metallic component. The second layer comprising the metallic component may be adhered to one or both sides of the structural material. Alternatively, the water repellent material, antifungal material, antibacterial material, etc., may be added to the first layer coating before it is adhered to the substrate.

It should be understood that compositions other than those described above may be used while utilizing the principles underlying the present invention. For example, other sources of filler as well as mixtures of acrylic latex and/or surfactants and metallic components may be used in formulating the structural materials of the present invention. Moreover, the coating compositions may be applied to various types of substrates, as described above.

What is claimed is:

1. A heat insulating and fire resistant composite material consisting essentially of:
   (a) a first layer which comprises a surfactant component, surfactant-generated microcells, a filler component and a binder component; and
   (b) a second layer comprising a metallic component adhered to the first layer.

2. A heat insulating and fire resistant composite material comprising:
   (a) a substrate;
   (b) a first layer adhered to the substrate to provide a coated substrate, said first layer comprising a surfactant component, surfactant-generated microcells, a filler component comprising clay and a binder component, wherein said binder bonds the filler material together and to the substrate and wherein said first layer does not bleed through the substrate; and
   (c) a second layer comprising a metallic component adhered to the coated substrate.

3. The composite material according to claim 2 wherein said substrate is planar and said first layer is adhered to one side of the substrate.

4. The composite material according to claim 2 wherein said substrate is planar and said first layer is adhered to both sides of the substrate.

5. The composite material according to claims 3 or 4 wherein said second layer is adhered to one side of said coated substrate.

6. The composite material according to claims 3 or 4 wherein said second layer is adhered to both sides of said coated substrate.

7. The composite material of claim 1, wherein said first layer is planar and the second layer is adhered to one side of the first layer.

8. The composite material of claim 1, wherein said first layer is planar and the second layer is adhered to both sides of the first layer.

9. The composite material according to claims 1 or 2 wherein said composite material further includes a water repellent material.

10. The composite material according to claims 1 or 2 wherein said composite material further includes an antifungal material.

11. The composite material according to claims 1 or 2 wherein said composite material further includes an antibacterial material.

12. The composite material according to claims 1 or 2 wherein said composite structural material further includes a surface friction agent.

13. The composite material according to claims 1 or 2 wherein said composite structural material further includes a flame retardant material.

14. The composite material according to claims 1 or 2 wherein said composite material further includes an algaecide.

15. The composite material according to claims 1 or 2 wherein said first layer is colored with dye.

16. The composite material according to claims 1 or 2 wherein the filler component comprises clay.

17. The composite material according to claims 1 or 2 wherein the surfactant component is a fast soap.

18. The composite material according to claims 1 or 2 wherein the surfactant component forms surfactant-generated microcells.

19. The composite material according to claims 1 or 2 wherein the binder component is SBR latex.

20. The composite material according to claim 1 or 2 wherein the metallic component is selected from the group consisting of aluminum or stainless steel.

21. The composite material according to claim 20, wherein the metallic component is aluminum foil.

* * * * *